United States Patent
Bauchot et al.

(10) Patent No.: US 8,932,015 B2
(45) Date of Patent: Jan. 13, 2015

(54) HYDRAULIC CYCLIC BLADE SPEED CONTROL APPARATUS AND METHOD

(75) Inventors: Frederic Bauchot, Saint-Jeannet (FR); Jean-Yves Clement, Saint-Jeannet (FR); Carole Truntschka, Saint-Laurent-du-Var (FR)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 13/105,996

(22) Filed: May 12, 2011

(65) Prior Publication Data

US 2012/0282090 A1    Nov. 8, 2012

(30) Foreign Application Priority Data

May 6, 2011    (EP) ..................... 11305536

(51) Int. Cl.
*B64C 27/57* (2006.01)
*B64C 27/635* (2006.01)
*B64C 27/64* (2006.01)

(52) U.S. Cl.
CPC ............... *B64C 27/635* (2013.01); *B64C 27/57* (2013.01); *B64C 27/64* (2013.01)
USPC .................. 416/1; 416/134 A; 416/157 B

(58) Field of Classification Search
CPC ...... B64C 27/021; B64C 27/51; B64C 27/54; B64C 27/56; B64C 27/57; B64C 27/64; B64C 27/72; B64C 27/605; B64C 27/635
USPC ............. 416/1, 46, 47, 83, 99, 100, 103–108, 416/134 A, 136, 141, 153–156, 157 B
See application file for complete search history.

(56) References Cited

U.S. PATENT DOCUMENTS

| | | | |
|---|---|---|---|
| 2,465,681 A * | 3/1949 | Gluhareff | 416/106 |
| 2,957,526 A * | 10/1960 | Derschmidt | 416/105 |
| 3,035,644 A | 5/1962 | Derschmidt | |
| 3,204,701 A * | 9/1965 | Muller et al. | 416/105 |
| 3,289,770 A | 12/1966 | Derschmidt | |
| 3,729,272 A | 4/1973 | Lemont | |
| 4,650,400 A | 3/1987 | David | |
| 4,697,986 A | 10/1987 | David | |

(Continued)

OTHER PUBLICATIONS

U.S. Appl. No. 12/883,250, filed Sep. 16, 2010; First Named Inventor—Bauchot et al.; Confirmation No. 4484.

(Continued)

*Primary Examiner* — Edward Look
*Assistant Examiner* — Danielle M Christensen
(74) *Attorney, Agent, or Firm* — Schmeiser, Olsen & Watts; John Pivnichny

(57) ABSTRACT

A hydraulic blade speed control apparatus and method. The apparatus includes a rotor assembly comprising a shaft; a first blade assembly pivotably attached to the shaft at a first initial position; a second blade assembly pivotably attached to the shaft assembly at a second initial position opposite to the first initial position; and a hydraulic movement mechanism. An initial angle of 180 degrees exists between the first blade assembly with said respect to the second blade assembly. The rotor assembly is configured to rotate the first blade assembly and the second blade assembly in a first direction and a second direction opposite to the first direction. The hydraulic movement mechanism is configured to pivotably move the first blade assembly in different angular positions with respect to the rotor assembly and the second blade assembly.

16 Claims, 11 Drawing Sheets

(56) References Cited

U.S. PATENT DOCUMENTS

| | | | |
|---|---|---|---|
| 4,720,059 | A | 1/1988 | Stearns, Jr. |
| 4,763,285 | A * | 8/1988 | Moore et al. ............... 701/14 |
| 4,783,023 | A | 11/1988 | Jupe |
| 5,110,314 | A | 5/1992 | Fujihara et al. |
| 5,135,357 | A | 8/1992 | Pancotti |
| 5,228,640 | A | 7/1993 | Mouille |
| 5,372,478 | A | 12/1994 | McCafferty |
| 5,913,659 | A | 6/1999 | Doolin et al. |
| 6,182,923 | B1 | 2/2001 | Weinhart |
| 6,190,132 | B1 | 2/2001 | Yamakawa et al. |
| 6,398,496 | B1 * | 6/2002 | Jokinen ............... 416/1 |
| 8,807,946 | B2 | 8/2014 | Bauchot et al. |
| 2006/0197043 | A1 * | 9/2006 | Santinanavat et al. ......... 251/92 |
| 2009/0180882 | A1 | 7/2009 | Stille et al. |
| 2011/0027082 | A1 * | 2/2011 | Herpin ............... 416/1 |
| 2012/0070279 | A1 | 3/2012 | Bauchot et al. |

OTHER PUBLICATIONS

Office Action (Mail Date Aug. 19, 2013) for U.S. Appl. No. 12/883,250, filed Sep. 16, 2010; Confirmation No. 4484.

Amendment filed Nov. 8, 2013 in response to Office Action (Mail Date Aug. 19, 2013) for U.S. Appl. No. 12/883,250, filed Sep. 16, 2010; Confirmation No. 4484.

Notice of Allowance (Mail Date Mar. 6, 2014) for U.S. Appl. No. 12/883,250, filed Sep. 16, 2010; Confirmation No. 4484.

U.S. Appl. No. 14/307,629, filed Jun. 18, 2014; Confirmation No. 6635.

* cited by examiner

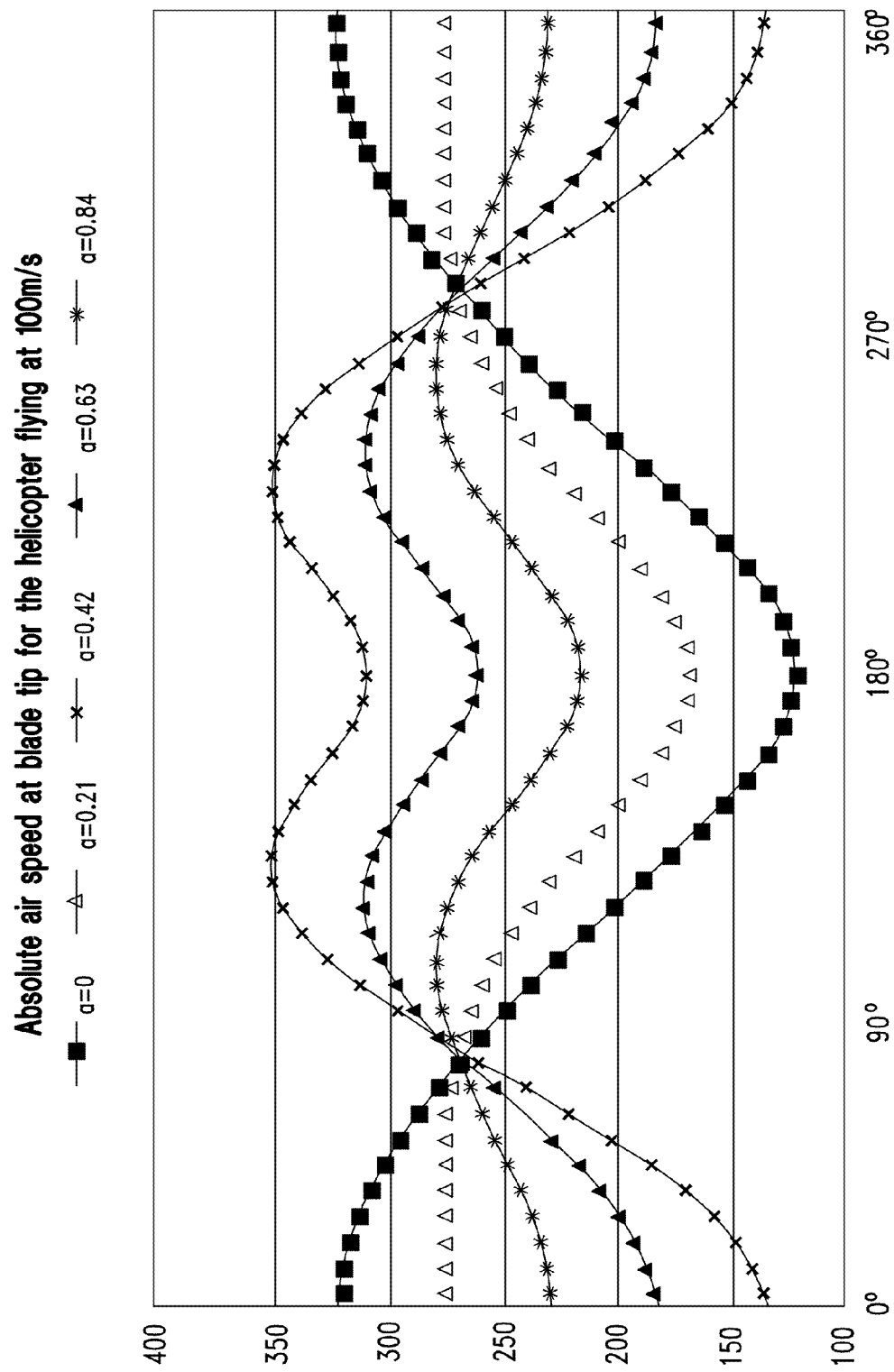

US 8,932,015 B2

HYDRAULIC CYCLIC BLADE SPEED CONTROL APPARATUS AND METHOD

CROSS-REFERENCE TO RELATED APPLICATIONS

This invention is related to U.S. patent application Ser. No. 12/883,250 entitled "CYCLIC BLADE SPEED CONTROL APPARATUS AND METHOD", filed on Sep. 16, 2010.

FIELD OF THE INVENTION

The present invention relates to an apparatus and method for hydraulically controlling a blade speed for an aircraft.

BACKGROUND OF THE INVENTION

Controlling various motions of an apparatus typically comprises an inefficient process with little flexibility. Accordingly, there exists a need in the art to overcome the deficiencies and limitations described herein above.

SUMMARY OF THE INVENTION

The present invention provides an apparatus comprising: a rotor assembly comprising a shaft; a first blade assembly pivotably attached to the shaft at a first initial position; a second blade assembly pivotably attached to the shaft assembly at a second initial position opposite to the first initial position, wherein an initial angle of 180 degrees exists between the first blade assembly with the respect to the second blade assembly, wherein the rotor assembly is configured to rotate the first blade assembly and the second blade assembly in a first direction and a second direction opposite to the first direction; and a hydraulic movement mechanism configured to pivotably move the first blade assembly in different angular positions with respect to the rotor assembly and the second blade assembly.

The present invention provides a method comprising: providing an apparatus comprising a rotor assembly comprising a shaft, a first blade assembly pivotably attached to the shaft at a first initial position, a second blade assembly pivotably attached to the shaft assembly at a second initial position opposite to the first initial position, and a hydraulic movement mechanism, wherein an initial angle of 180 degrees exists between the first blade assembly with the respect to the second blade assembly; first rotating, by the rotor assembly, the first blade and the second blade in a first direction; and pivotably moving, by the hydraulic movement mechanism, the first blade assembly in different angular positions with respect to the rotor assembly and the second blade assembly.

The present invention provides a computer program product, comprising a computer readable storage medium having a computer readable program code embodied therein, the computer readable program code comprising an algorithm that when executed by a computer processor of a computing system implements a method for controlling an apparatus comprising a rotor assembly comprising a shaft, a first blade assembly pivotably attached to the shaft at a first initial position, a second blade assembly pivotably attached to the shaft assembly at a second initial position opposite to the first initial position, and a hydraulic movement mechanism, wherein an initial angle of 180 degrees exists between the first blade assembly with the respect to the second blade assembly, the method comprising: first rotating, by the rotor assembly, the first blade and the second blade in a first direction; and pivotably moving, by the hydraulic movement mechanism, the first blade assembly in different angular positions with respect to the rotor assembly and the second blade assembly.

The present invention advantageously provides a simple method and associated system capable of controlling various motions of an apparatus.

BRIEF DESCRIPTION OF THE DRAWINGS

FIGS. 5D-5F illustrate various embodiments associated with an absolute air speed at blade tip in relationship with a correction angle, in accordance with embodiments of the present invention.

DETAILED DESCRIPTION OF THE INVENTION

Figure 1:
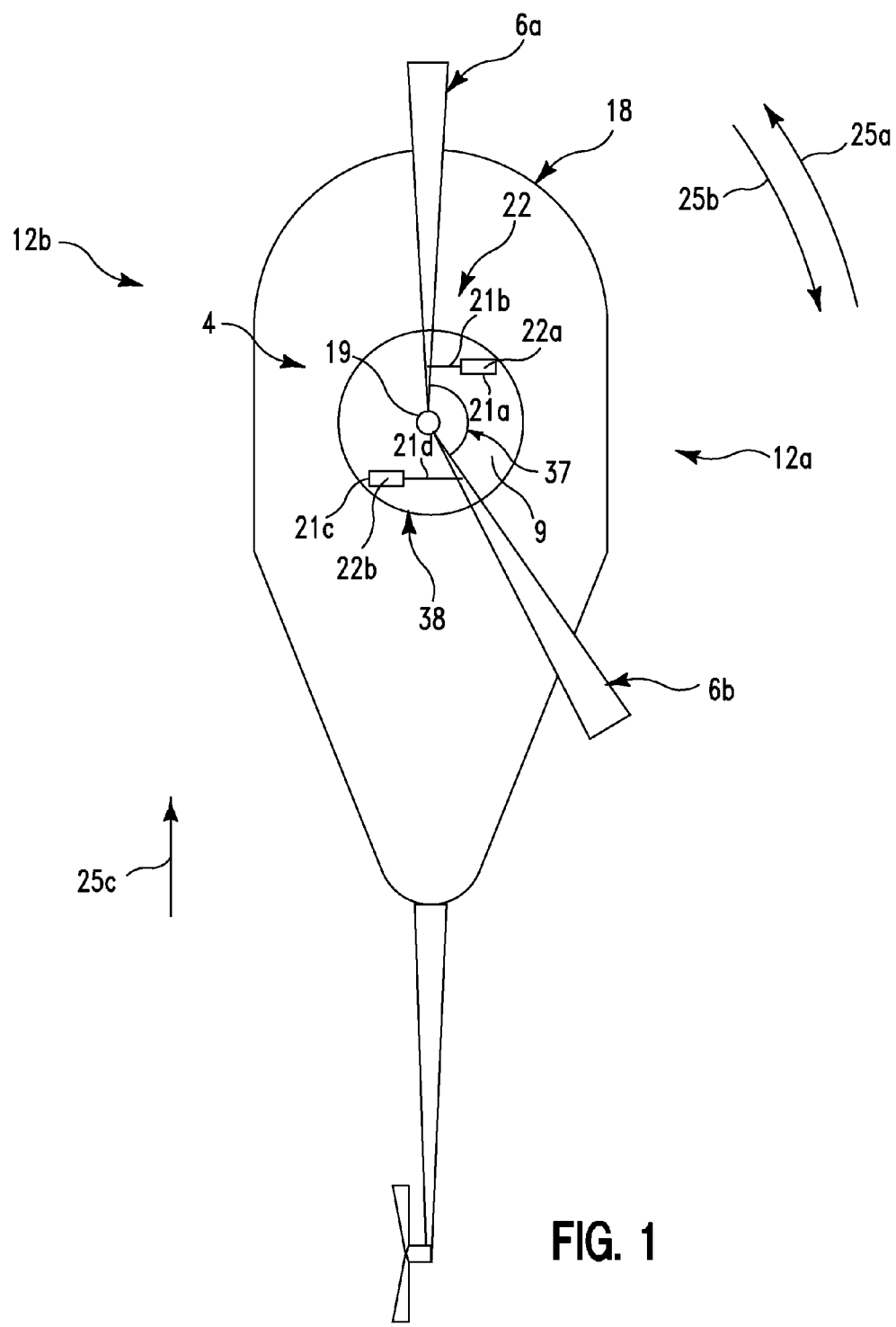
FIG. 1 illustrates a top view of an aircraft comprising an apparatus for controlling a blade speed for an aircraft, in accordance with embodiments of the present invention.

FIG. 1 illustrates a top view of an aircraft 18 comprising an apparatus 4 for controlling a blade speed for an aircraft 18, in accordance with embodiments of the present invention. Aircraft 18 may comprise any type of aircraft including, inter alia, a helicopter, an airplane, etc. Apparatus 4 enables aircraft 18 to fly in various directions (e.g., up, down, forward, backwards, etc). Aircraft 18 may fly in a helicopter translation direction 25c along an x-axis. Apparatus 4 comprises blade assemblies 6a and 6b movably attached to a rotor 19 or center shaft (e.g., in opposite initial positions). Note that apparatus 4 may comprise any number of blade assemblies (e.g., 1, 2, 3, 4, 5 ..., etc). Additionally, note that blade assemblies 6a and 6b may comprise a same length or different lengths. Apparatus 4 additionally comprises a hydraulic movement mechanism 22 and a rotation crown 9. Hydraulic movement mechanism 22 comprises a hydraulic cylinder 22a hydraulically connected to a hydraulic cylinder 22b. Hydraulic cylinder 22a and hydraulic cylinder 22b are mechanically attached to rotor 19 and/or rotation crown 9. Hydraulic movement mechanism 22 may additionally comprise a hydraulic fluid control cylinder (e.g., hydraulic cylinder 22c as described with respect to FIG. 2, infra) hydraulically connected between hydraulic cylinder 22a and hydraulic cylinder 22b. Additionally, hydraulic movement mechanism 22 may comprise any number of hydraulic cylinders (e.g., 1, 2, 3, 4, 5 . . . , etc) dependent on a number of blade assemblies comprised by apparatus 4. Hydraulic cylinder 22a comprises a piston 21b slidably attached to a cylinder 21a. Piston 21b is pivotably attached to blade assembly 6a. Hydraulic cylinder 22b comprises a piston 21d slidably attached to a cylinder 21c. Piston 21d is pivotably attached to blade assembly 6b. Rotation crown 9 and/or rotor 19 is configured to rotate blade assemblies 6a and 6b in directions 25a and 25b. Before rotation of blade assemblies 6a and 6b, an initial angle of 180 degrees may exist between blade assembly 6a with the respect to blade assembly 6b. Hydraulic cylinder 22a is configured to pivotably move blade assembly 6a in different angular positions with respect to rotor 19, rotation crown 9, and/or blade assembly 6b. Additionally, hydraulic cylinder 22b is configured to pivotably move blade assembly 6b in different angular positions with respect to rotor 19, rotation crown 9, and/or blade assembly 6a. Hydraulic cylinders 22a and 22b pivotably moving blade assemblies 6a and 6b cause generate a first angle 37 between blade assemblies 6a and 6b in order to compensate for speed limitation (i.e., for aircraft 18) due to speed (i.e., a speed of sound) reached by an advancing blade tip (e.g., blade assembly 6b) and a stall of a retreating blade tip (e.g., blade assembly 6a). First angle 37 may comprise any angle that is not 180 degrees. Hydraulic movement mechanism 22 may additionally comprise any type of electro/mechanical device capable of controlling a flow of hydraulic fluid between hydraulic cylinder 22a and hydraulic cylinder 22b. For example, hydraulic movement mechanism 22 may include, inter alia, a solenoid, a spring loaded movement mechanism, etc.

Apparatus 4 enables aircraft 18 to increase a top end speed to be greater than 400 km/h by correcting a speed dissymmetry between blade assemblies 6a and 6b. For example, blade assembly 6b moving in an advancing direction (i.e., direction 25b) in combination with blade assembly 7a moving in a retreating direction (i.e., direction 25a) generates a load dissymmetry between side 12a of aircraft 18 and side 12b of aircraft 18. The load dissymmetry limits a maximum load, increases consumption, and generates a great deal of strain on rotor 19. Apparatus 4 enables each of blade assemblies 6a and 6b to achieve independent (i.e., with respect to each other) variable speeds according to their position in a rotation cycle. Hydraulic cylinder 22a slidably moves piston 21b resulting in blade assembly 6a being moved to different angular positions with respect to rotor 19, rotation crown 9, and/or blade assembly 6b. Hydraulic cylinder 22b slidably moves piston 21d resulting in blade assembly 6b being moved to different angular positions with respect to rotor 19, rotation crown 9, and/or blade assembly 6a. A control system 38 may be configured to generate a control signal for controlling hydraulic movement mechanism 22. Control system 38 may comprise a notification system configured to notify an individual that hydraulic movement mechanism 22 has been enabled and/or activated.

Figure 2:
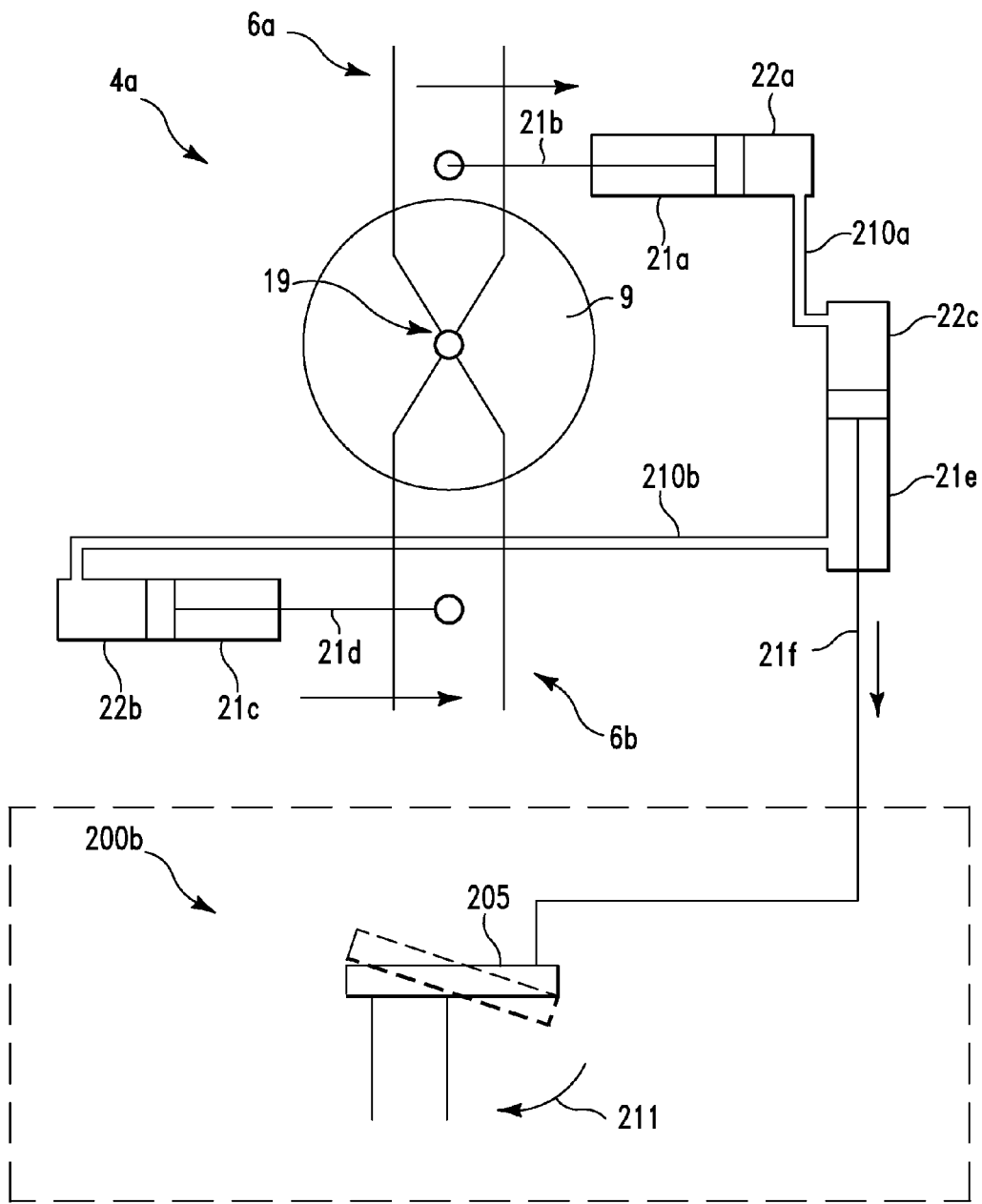
FIG. 2 illustrates a hydraulic for controlling the apparatus of FIG. 1, in accordance with embodiments of the present invention.

FIG. 2 illustrates a top view of an alternative apparatus 4a to apparatus 4 of FIG. 1, in accordance with embodiments of the present invention. Additionally, FIG. 2 illustrates a side view of a swash plate apparatus 200 (i.e., comprising a rotating swash plate 205) located below apparatus 4a. In contrast to apparatus 4 of FIG. 1, apparatus 4a of FIG. 2 comprises a hydraulic fluid control cylinder 22c hydraulically connected (i.e., via hydraulic lines 210a and 210b) between hydraulic cylinder 22a and hydraulic cylinder 22b. Hydraulic cylinder 22c comprises a piston 21f slidably attached to a cylinder 21e Hydraulic fluid control cylinder 22c is mechanically attached to rotor 19 and/or rotation crown 9. Hydraulic fluid control cylinder 22c comprises piston 21f pivotably attached to rotating swash plate 205. Rotating swash plate 205 may be comprised by rotor 19. Hydraulic fluid control cylinder 22c is hydraulically attached between hydraulic cylinder 22a and hydraulic cylinder 22b such that hydraulic fluid flows proportionally between hydraulic cylinder 22a, hydraulic cylinder 22b, and hydraulic fluid control cylinder 22c. For example, a volume of hydraulic fluid injected by hydraulic fluid control cylinder 22c into hydraulic cylinder 22a comprises a same volume as hydraulic fluid removed by hydraulic fluid control cylinder 22c from hydraulic cylinder 22b at a same time (and vice-versa). Rotating swash plate 205 is configured to rotate (in a direction 211) and slidably move piston 21f thereby forcing hydraulic fluid between hydraulic fluid control cylinder 22c, hydraulic cylinder 22a, and hydraulic cylinder 22b and controlling a flow of the hydraulic fluid between hydraulic fluid control cylinder 22c, hydraulic cylinder 22a, and hydraulic cylinder 22b. The flow of hydraulic fluid between hydraulic fluid control cylinder 22c, hydraulic cylinder 22a, and hydraulic cylinder 22b controls:

2. Blade Assembly 6b being Moved to Different Angular Positions with Respect to Rotor 19, Rotation Crown 9, and/or Blade Assembly 6a.

Note that apparatus 4a may comprise any number of blade assemblies (e.g., 1, 2, 3, 5 . . . , etc).

Figure 3A:
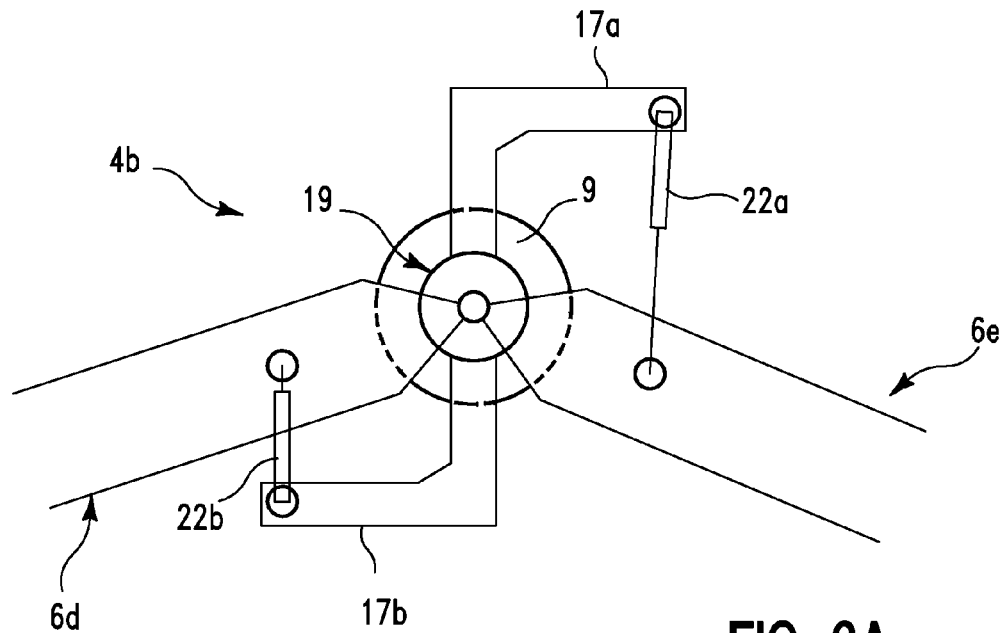
FIG. 3A illustrates an alternative apparatus to apparatus of FIGS. 1 and 2, in accordance with embodiments of the present invention.

FIG. 3A illustrates a top view of an alternative apparatus 4b to apparatus 4 of FIG. 1 and apparatus 4a of FIG. 2, in accordance with embodiments of the present invention. In contrast to apparatus 4 of FIG. 1 and apparatus 4a of FIG. 2, apparatus 4b of FIG. 3A comprises a first elongated member 17a mechanically attaching hydraulic cylinder 22a to rotor 19 and/or rotation crown 9 and a second elongated member 17b mechanically attaching hydraulic cylinder 22b to rotor 19 and/or rotation crown 9. Apparatus 4b may additionally comprise hydraulic fluid control cylinder 22c and swash plate apparatus 200 of FIG. 2.

Figure 3B:
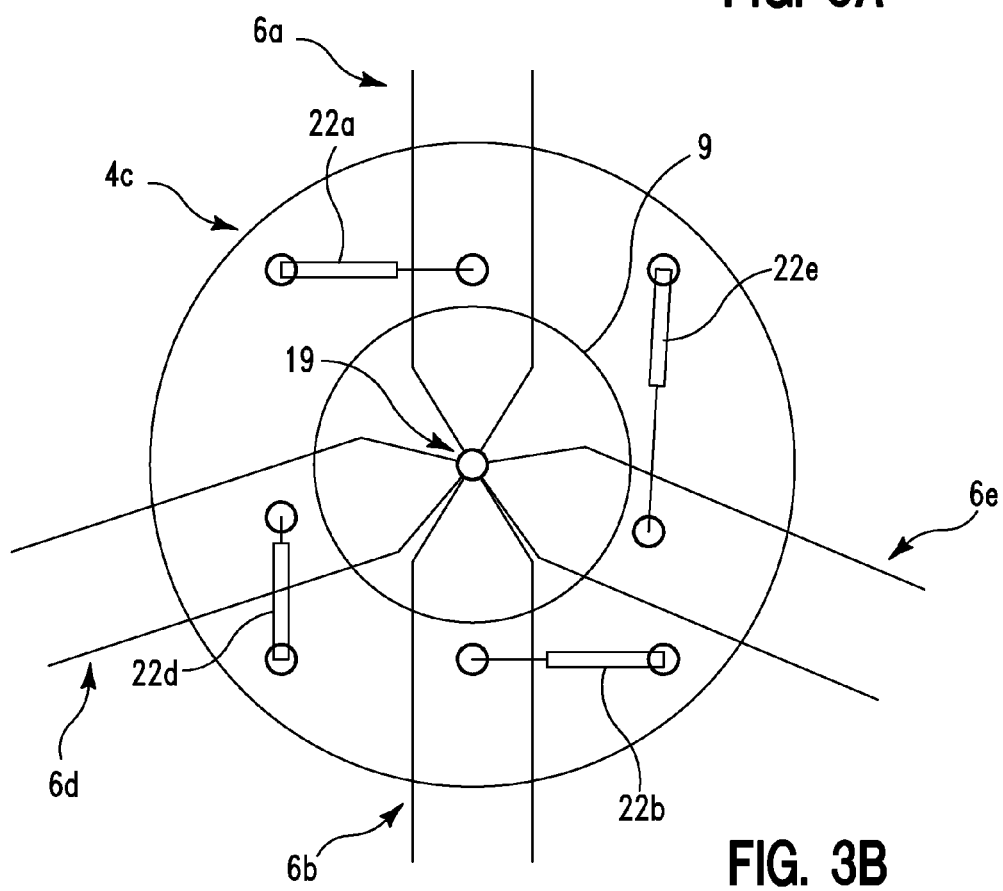
FIG. 3B illustrates an alternative apparatus to apparatus of FIGS. 1, 2, and 3A, in accordance with embodiments of the present invention.

FIG. 3B illustrates a top view of an alternative apparatus 4c to apparatus 4 of FIG. 1, apparatus 4a of FIG. 2, and apparatus 4b of FIG. 3A, in accordance with embodiments of the present invention. In contrast to apparatus 4 of FIG. 1, apparatus 4a of FIG. 2, and apparatus 4b of FIG. 3A; apparatus 4c of FIG. 3B comprises additional blade assembly 6d with associated hydraulic cylinder 22d and additional blade assembly 6e with associated hydraulic cylinder 22e. Hydraulic cylinder 22d moves blade assembly 6d to different angular positions with respect to rotor 19, rotation crown 9, and/or blade assemblies 6a, 6b, and 6e. Hydraulic cylinder 22e moves blade assembly 6e to different angular positions with respect to rotor 19, rotation crown 9, and/or blade assemblies 6a, 6b, and 6d. Apparatus 4c may additionally comprise hydraulic fluid control cylinder 22c and swash plate apparatus 200 of FIG. 2.

Figure 4:
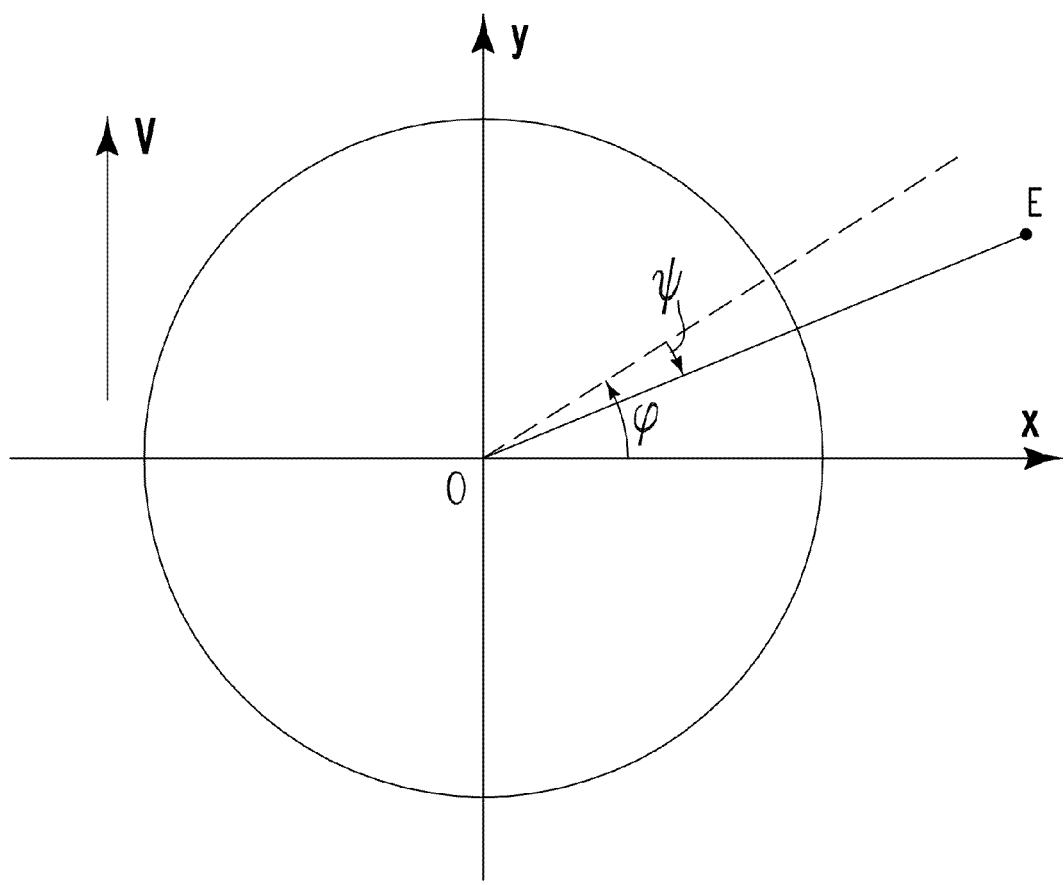
FIG. 4 illustrates a diagram describing calculations for determining angular movement of any of the blades of FIGS. 1-3B, in accordance with embodiments of the present invention.

FIG. 4 illustrates a diagram describing calculations for determining angular movement of any of the blades of FIGS. 1-3B, in accordance with embodiments of the present invention.

From the following equation 1 (coordinates of the point E (at an end of the wing)):

$$X = L\cos(\theta), Y = St + L\sin(\theta), \theta = \phi + \psi, \phi = \omega t, \psi = -a \times \sin(\omega t)$$

Converted to:

$$X = L \times \cos[\omega t - a \times \sin(\omega t)]$$

$$Y = St + L \times \sin[\omega t - a \times \sin(\omega t)]$$

The speed vector is equal to:

$$\frac{\partial X}{\partial t} = -L\omega\sin(\omega t - a \times \sin(\omega t)) \times (1 - a \times \cos(\omega t))$$

$$\frac{\partial Y}{\partial t} = S + L\omega\cos(\omega t - a \times \sin(\omega t)) \times (1 - a \times \cos(\omega t))$$

Where "a" represents a maximum amplitude correction angle applied to the blade cyclic angle $\phi = \omega t$ and "a" is in radian.

Figure 5A:
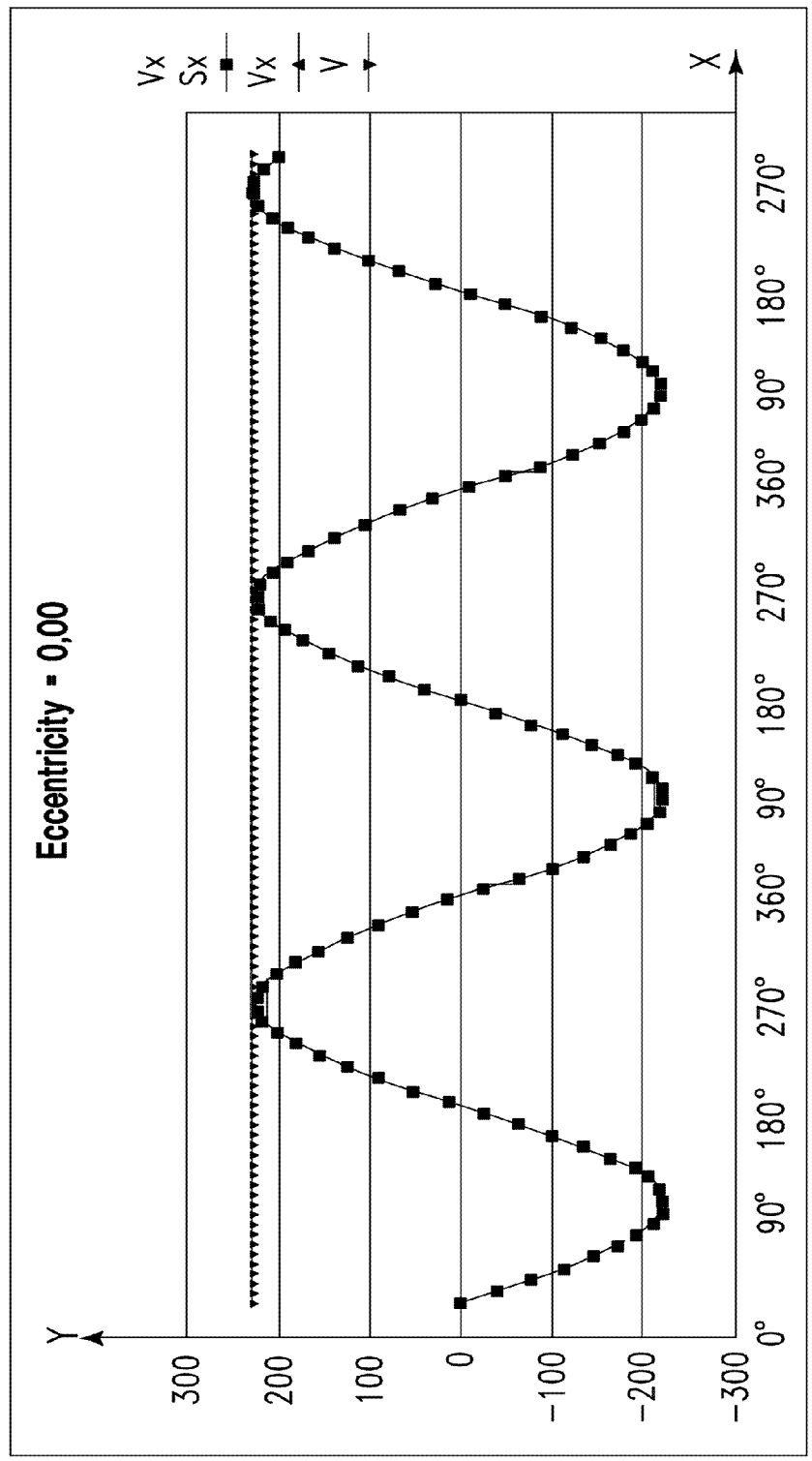
FIG. 5A illustrates a graph describing an example of a stationary flight for aircraft of FIGS. 1-3B as a function of blade angle correction, in accordance with embodiments of the present invention.

FIG. 5A illustrates a graph describing an example of a stationary flight for aircraft 18 of FIGS. 1-3B as a function of blade angle correction, in accordance with embodiments of the present invention.

Figure 5B:
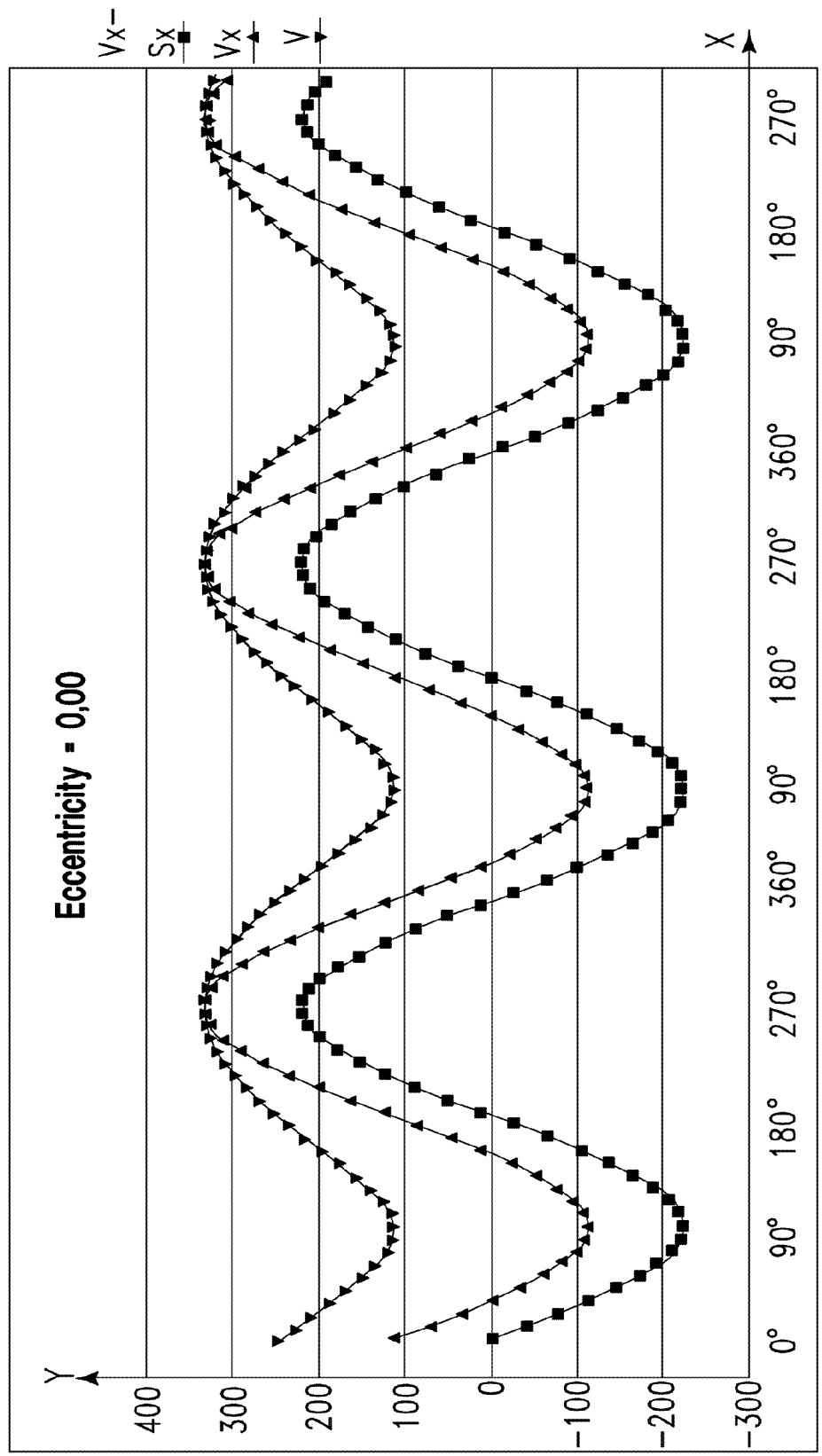
FIG. 5B illustrates an alternative graph to the graph of FIG. 5A, in accordance with embodiments of the present invention.
Figure 5C:
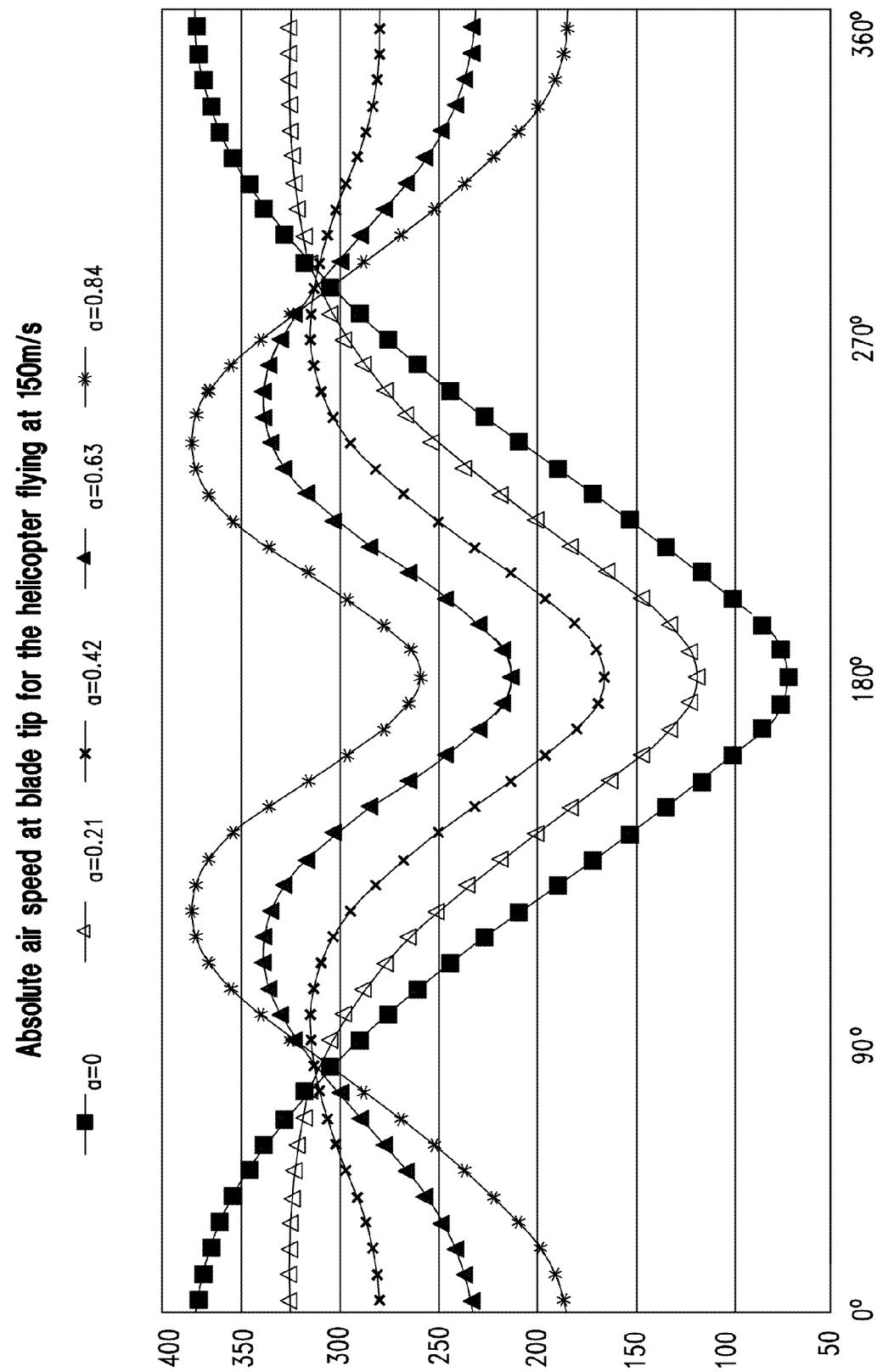
FIG. 5C illustrates an alternative graph to the graph of FIG. 5B, in accordance with embodiments of the present invention.

The following simulation parameters apply to aircraft 18 with respect to the graphs of FIGS. 5A-5C:
Blade length L=10 m
Aircraft speed S=400 km/h
Angular speed ω=22.22 rad/s In the example illustrated in FIG. 5A, aircraft 18 is flying in a stationary mode (i.e., a displacement speed=0). The rotation crown (e.g., rotation crown 9 of FIG. 1) is rotating at 22.22 radians/second thereby inducing a linear speed at each blade tip of: 800 Km/h. In the graph of FIG. 5, the Y-axis represents a speed in meters per second and the X-axis represents a blade position during rotor rotation (i.e., in degrees). Vx represents a tip blade speed on the X axis in an air referential. Sx represents an aircraft speed on the X axis in the air referential. Vx−Sx represents a tip blade speed on the X axis in an aircraft referential. V represents a relative to an air absolute tip blade speed. The graph of FIG. 5A illustrates aircraft 18 in stationary flight where V is a constant (222.22 m/s=800 Km/h), Sx=0, and therefore Vx−Sx=Vx resulting in a perfect sinusoidal wave.

FIG. 5B illustrates an alternative graph to the graph of FIG. 5A, in accordance with embodiments of the present invention. In contrast to the graph of FIG. 5A, the graph of FIG. 5B describes an example of a translation flight for aircraft 18 of FIGS. 1-3B. The simulation parameters described with respect to the graph of FIG. 5A are applicable to the graph of FIG. 5B. In the example illustrated in FIG. 5B, aircraft 18 is flying in forward translation along the X axis at 400 Km/h (i.e., 111.111 m/s) and a blade tip air speed varies from 400 Km/h to 1,200 Km/h thereby causing an advancing blade to reach a supersonic speed limit and a retreating blade reach a stall speed limit resulting in a V amplitude limiting translation speed.

Figure 5D:
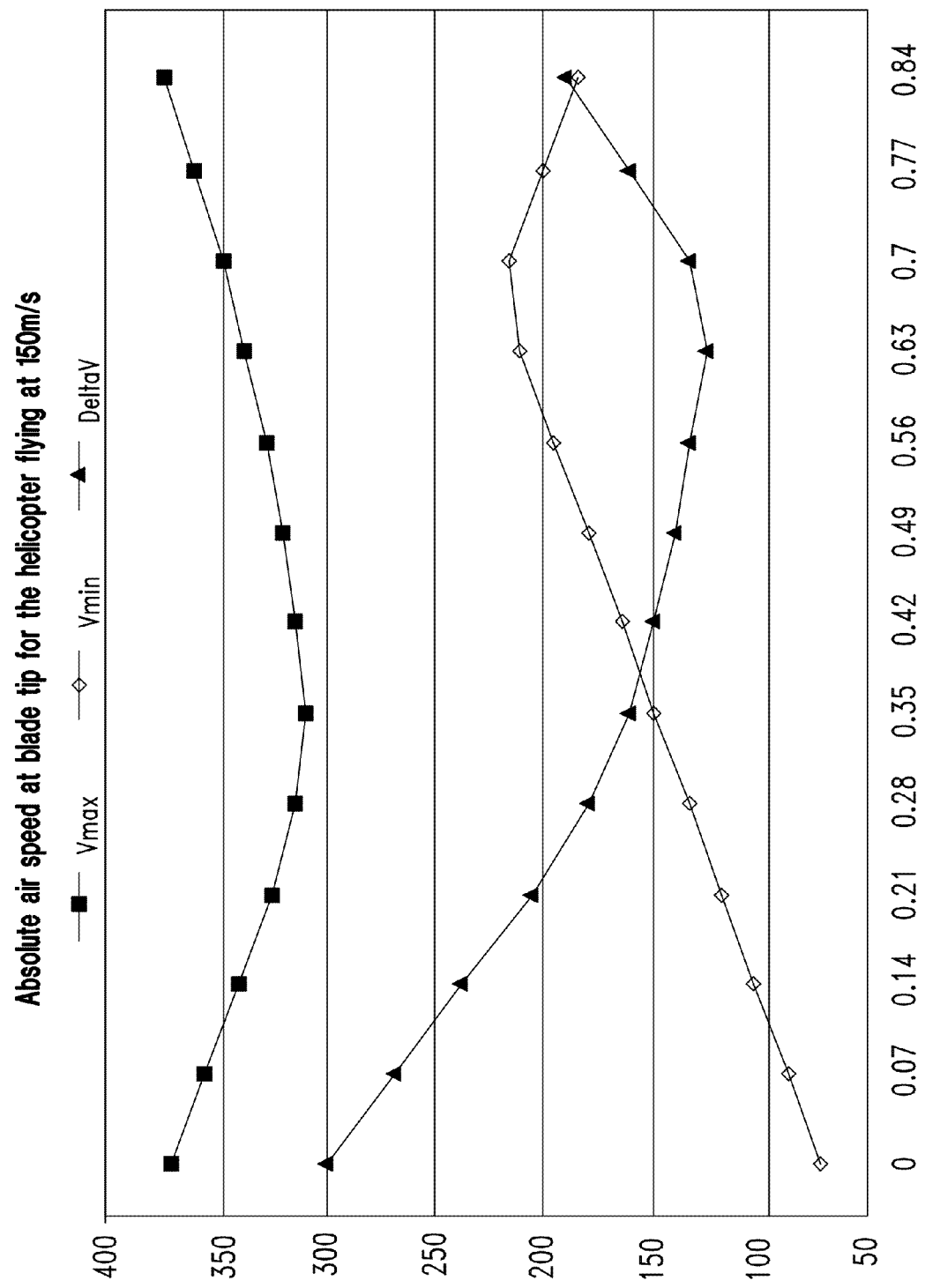
Figure 5F:
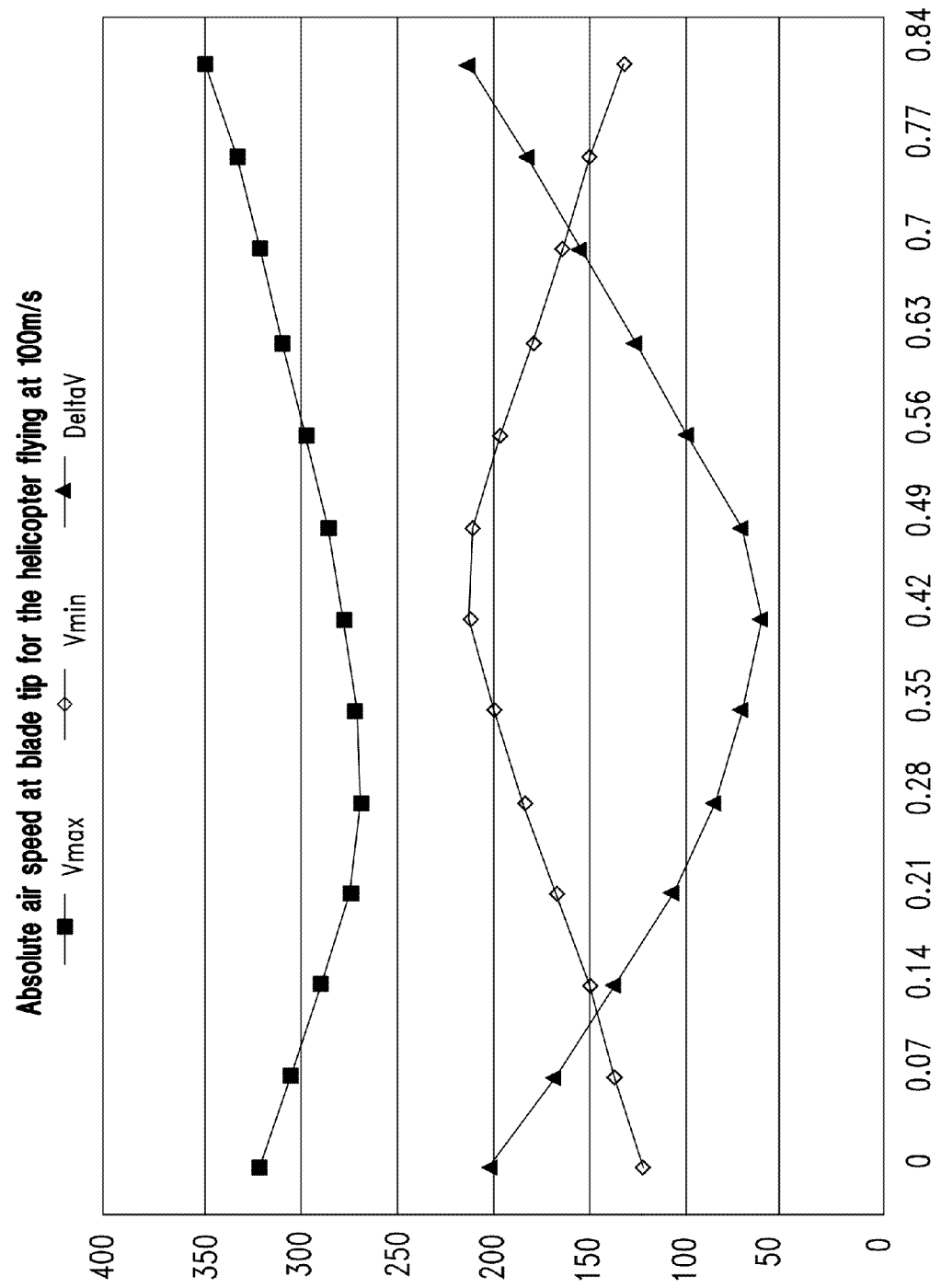

FIG. 5C illustrates an alternative graph to the graph of FIG. 5B, in accordance with embodiments of the present invention. In contrast to the graph of FIG. 5B, the graph of FIG. 5C describes an example of a translation flight with different swash plate positions generating a maximum blade angle correction "a" of 0.21, 0.42, 0.63 and 0.84 radians for aircraft 18 of FIGS. 1-3B. The simulation parameters described with respect to the graph of FIG. 5A are applicable to the graph of FIG. 5C. In the example illustrated in FIG. 5C, aircraft 18 is flying in forward translation along the X axis at 540 Km/h (i.e., 150 m/s). This illustrates that there is an optimum value for the parameter "a" such as, inter alia, maximum speed decreases, minimum speed increases, difference reaches a minimum, etc as illustrated in FIGS. 5D-5F, infra. Different choices may be selected according to a target result.
A=0.35 minimizes the maximum speed.
A=0.7 maximizes the minimal speed.
A=0.63 minimizes the speed difference.

FIG. 5D illustrates an absolute air speed at blade tip in relationship with a correction angle, in accordance with embodiments of the present invention. The Y-axis represents a speed in meters per second and the X-axis represents a blade maximum correction angle in radians.

FIG. 5E illustrates an alternative to FIG. 5C, in accordance with embodiments of the present invention. FIG. 5E illustrates a helicopter flying at 100 m/s.

FIG. 5F illustrates an alternative to FIG. 5D, in accordance with embodiments of the present invention. FIG. 5E illustrates a helicopter flying at 100 m/s. At this speed it appears that:
A=0.25 minimizes the maximum speed.
A=0.45 maximizes the minimal speed.
A=0.40 minimizes the speed difference.

Figure 6:
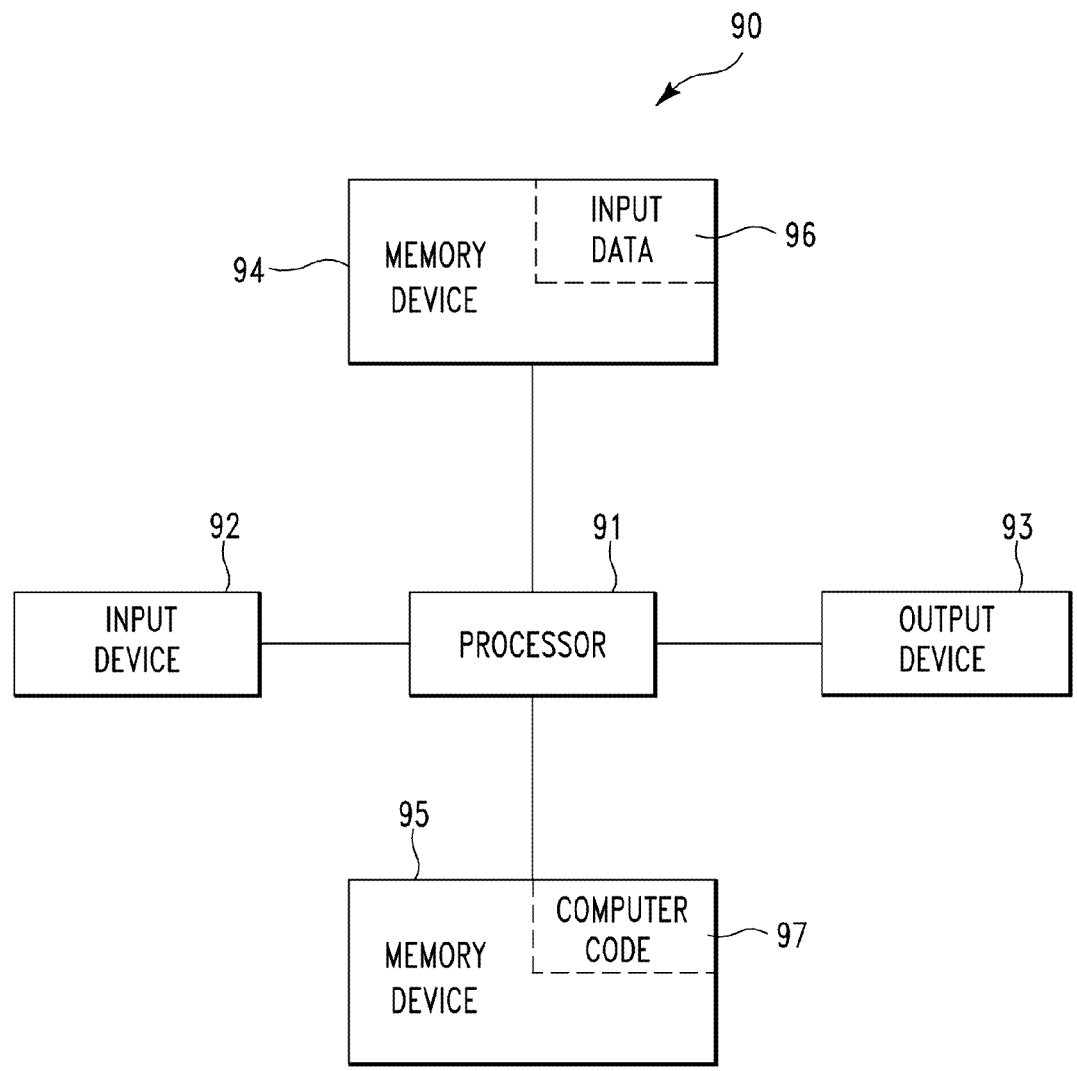
FIG. 6 illustrates a computer apparatus used for controlling a blade speed for the aircraft of FIGS. 1-3B, in accordance with embodiments of the present invention.

FIG. 6 illustrates a computer apparatus 90 used for controlling a blade speed or hydraulic movement for aircraft 18 of FIGS. 1-3B, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms for controlling a blade speed or hydraulic movement for aircraft 18 of FIGS. 1-3B. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise an algorithm and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to control a blade speed or hydraulic movement for aircraft 18 of FIGS. 1-3. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for controlling a blade speed or hydraulic movement for aircraft 18 of FIGS. 1-3B. In another embodiment, the invention provides a method that performs the process steps of the invention on a subscription, advertising, and/or fee basis. That is, a service provider, such as a Solution Integrator, could offer to control a blade speed or hydraulic movement for aircraft 18 of FIGS. 1-3B. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An apparatus comprising:
   a rotor assembly comprising a center shaft;
   a first blade assembly pivotably and directly attached to said shaft assembly at a first initial position, wherein said first blade assembly is in direct mechanical contact with said center shaft;
   a second blade assembly pivotably and directly attached to said center shaft at a second initial position opposite to said first initial position, wherein said second blade assembly is in direct mechanical contact with said center shaft, wherein an initial angle of 180 degrees exists between said first blade assembly with said respect to said second blade assembly, wherein said rotor assembly is configured to rotate said first blade assembly and said second blade assembly in a first direction and a second direction opposite to said first direction;
   a hydraulic movement mechanism configured to pivotably move said first blade assembly in different angular positions with respect to said rotor assembly and said second blade assembly, wherein said hydraulic movement mechanism is configured to pivotably move said second blade assembly in different angular positions with respect to said rotor assembly and said first blade assembly, wherein said hydraulic movement mechanism comprises a first hydraulic cylinder mechanically attached to said rotor assembly and a second hydraulic cylinder mechanically attached to said rotor assembly, wherein said first hydraulic cylinder comprises a first piston pivotably attached to said first blade assembly, wherein said second hydraulic cylinder comprises a second piston pivotably attached to said second blade assembly, wherein said first hydraulic cylinder is configured to slidably move said first piston resulting in said first blade assembly being moved to said different angular positions with respect to said rotor assembly and said second blade assembly, wherein said second hydraulic cylinder is configured to slidably move said second piston resulting in said second blade assembly being moved to said different angular positions with respect to said rotor assembly and said first blade assembly;
   a first elongated member mechanically attaching said first hydraulic cylinder to said rotor assembly, wherein said first elongated member comprises a first section formed perpendicular to a second section, wherein said first section is mechanically attached to said rotor assembly and, wherein said second section is mechanically attached to said first hydraulic cylinder; and
   a second elongated member mechanically attaching said second hydraulic cylinder to said rotor assembly, wherein said second elongated member comprises a third section formed perpendicular to a fourth section, wherein said third section is mechanically attached to said rotor assembly and, wherein said fourth section is mechanically attached to said second hydraulic cylinder.

2. The apparatus of claim 1, wherein said hydraulic movement mechanism is configured to pivotably move said second blade assembly in different angular positions with respect to said rotor assembly and said first blade assembly.

3. The apparatus of claim 1, wherein said first hydraulic cylinder comprises a direct mechanical connection to said rotor assembly, and wherein said second hydraulic cylinder comprises a direct mechanical connection to said rotor assembly.

4. The apparatus of claim 1, wherein said hydraulic movement mechanism further comprises a third hydraulic cylinder mechanically attached to said rotor assembly, wherein said third hydraulic cylinder comprises a third piston pivotably attached to a rotating swash plate comprised by said rotor assembly, wherein said third hydraulic cylinder is hydraulically attached between said first hydraulic cylinder and said second hydraulic cylinder such that hydraulic fluid flows proportionally between said first hydraulic cylinder, said second hydraulic cylinder, and said third hydraulic cylinder, wherein said rotating swash plate is configured to rotate and slidably move said third piston thereby controlling a flow of said hydraulic fluid between said first hydraulic cylinder, said second hydraulic cylinder, and said third hydraulic cylinder, wherein said flow of said hydraulic fluid between said first hydraulic cylinder, said second hydraulic cylinder, and said third hydraulic cylinder controls said first blade assembly being moved to said different angular positions with respect to said rotor assembly and said second blade assembly; and wherein said flow of said hydraulic fluid between said first hydraulic cylinder, said second hydraulic cylinder, and said third hydraulic cylinder further controls said second blade assembly being moved to said different angular positions with respect to said rotor assembly and said first blade assembly.

5. The apparatus of claim 1, further comprising:
   a third blade assembly pivotably attached to said center shaft assembly at a third initial position, wherein said rotor assembly is configured to rotate said third blade assembly in said first direction and said second direction, wherein said hydraulic movement mechanism further comprises a third hydraulic cylinder and a fourth hydraulic cylinder mechanically attached to said rotor assembly, wherein said third hydraulic cylinder comprises a third piston pivotably attached to said third blade assembly, wherein said fourth hydraulic cylinder comprises a fourth piston pivotably attached to a rotating swash plate comprised by said rotor assembly, wherein said fourth hydraulic cylinder is hydraulically attached between said first hydraulic cylinder, said second hydraulic cylinder, and said third hydraulic cylinder such that hydraulic fluid flows between said first hydraulic cylinder, said second hydraulic cylinder, said third hydraulic cylinder, and said fourth hydraulic cylinder, wherein said rotating swash plate is configured to rotate and slidably move said fourth piston thereby controlling a flow of said hydraulic fluid between said first hydraulic cylinder, said second hydraulic cylinder, said third hydraulic cylinder, and said fourth hydraulic cylinder, and wherein said flow of said hydraulic fluid between said first hydraulic cylinder, said second hydraulic cylinder, said third hydraulic cylinder, and said fourth hydraulic cylinder controls said first blade assembly being moved: to said different angular positions with respect to said rotor assembly said second blade assembly, and said third blade assembly; said second blade assembly being moved to said different angular positions with respect to said rotor assembly, said first blade assembly, and said third blade assembly; and said third blade assembly being moved to different angular positions with respect to said rotor assembly, said first blade assembly, and said second blade assembly.

6. The apparatus of claim 5, further comprising:
a fourth blade assembly pivotably attached to said shaft assembly at a fourth initial position opposite to said third initial position, wherein an initial angle of 180 degrees exists between said third blade assembly with said respect to said fourth blade assembly, wherein said rotor assembly is configured to rotate said fourth blade assembly in said first direction and said second direction, wherein said hydraulic movement mechanism further comprises a fifth hydraulic cylinder mechanically attached to said rotor assembly, wherein said fifth hydraulic cylinder comprises a fifth piston pivotably attached to said fourth blade assembly, wherein said fourth hydraulic cylinder is hydraulically attached between said first hydraulic cylinder, said second hydraulic cylinder, said third hydraulic cylinder, and said fifth hydraulic cylinder such that said hydraulic fluid flows between said first hydraulic cylinder, said second hydraulic cylinder, said third hydraulic cylinder, said fourth hydraulic cylinder, and said fifth hydraulic cylinder, wherein said fourth piston additionally controls a flow of said hydraulic fluid between said first hydraulic cylinder, said second hydraulic cylinder, said third hydraulic cylinder, said fourth hydraulic cylinder, and said fifth hydraulic cylinder, and wherein said flow of said hydraulic fluid additionally controls said fifth blade assembly being moved to different angular positions with respect to said rotor assembly said first blade assembly, said second blade assembly, and said third blade assembly.

7. The apparatus of claim 1, wherein said apparatus is comprised by an aircraft.

8. The apparatus of claim 7, wherein said aircraft is a helicopter.

9. A method comprising:
providing an apparatus comprising a rotor assembly comprising a center shaft, a first blade assembly pivotably and directly attached to said center shaft at a first initial position, a second blade assembly pivotably and directly attached to said shaft assembly at a second initial position opposite to said first initial position, a first elongated member, a second elongated member, and a hydraulic movement mechanism, wherein said first blade assembly is in direct mechanical contact with said center shaft, wherein said second blade assembly is in direct mechanical contact with said center shaft, wherein said hydraulic movement mechanism comprises a first hydraulic cylinder mechanically attached to said rotor assembly and a second hydraulic cylinder mechanically attached to said rotor assembly, wherein said first hydraulic cylinder comprises a first piston pivotably attached to said first blade assembly, wherein said second hydraulic cylinder comprises a second piston pivotably attached to said second blade assembly, wherein said first elongated member mechanically attaches said first hydraulic cylinder to said rotor assembly, wherein said second elongated member mechanically attaches said second hydraulic cylinder to said rotor assembly, wherein said first elongated member comprises a first section formed perpendicular to a second section, wherein said first section is mechanically attached to said rotor assembly, wherein said second section is mechanically attached to said first hydraulic cylinder, wherein said second elongated member comprises a third section formed perpendicular to a fourth section, wherein said third section is mechanically attached to said rotor assembly, wherein said fourth section is mechanically attached to said second hydraulic cylinder, and wherein an initial angle of 180 degrees exists between said first blade assembly with said respect to said second blade assembly;
first rotating, by said rotor assembly, said first blade assembly and said second blade assembly in a first direction;
pivotably moving, by said hydraulic movement mechanism, said first blade assembly in different angular positions with respect to said rotor assembly and said second blade assembly;
slidably moving, by said first hydraulic cylinder, said first piston resulting in said pivotably moving said first blade assembly; and
slidably moving, by said second hydraulic cylinder, said second piston resulting in said pivotably moving said second blade assembly.

10. The method of claim 9, further comprising:
pivotably moving, by said hydraulic movement mechanism, said second blade assembly in different angular positions with respect to said rotor assembly and said first blade assembly.

11. The method of claim 9, wherein said hydraulic movement mechanism further comprises a third hydraulic cylinder mechanically attached to said rotor assembly, wherein said third hydraulic cylinder comprises a third piston pivotably attached to a swash plate comprised by said rotor assembly, wherein said third hydraulic cylinder is hydraulically attached between said first hydraulic cylinder and said second hydraulic cylinder such that hydraulic fluid flows proportionally between said first hydraulic cylinder, said second hydraulic cylinder, and said third hydraulic cylinder, and wherein said method further comprises:
rotating, said swash plate; and
slidably moving, by said swash plate during said rotating swash plate, said third piston thereby controlling a flow of said hydraulic fluid between said first hydraulic cylinder, said second hydraulic cylinder, and said third hydraulic cylinder, wherein said flow of said hydraulic fluid between said first hydraulic cylinder, said second hydraulic cylinder, and said third hydraulic cylinder controls said slidably moving said first piston and said slidably moving said second piston.

12. The method of claim 9, wherein said apparatus further comprises a third blade assembly pivotably attached to said center shaft at a third initial position, wherein said hydraulic movement mechanism further comprises a third hydraulic cylinder and a fourth hydraulic cylinder mechanically attached to said rotor assembly, wherein said third hydraulic cylinder comprises a third piston pivotably attached to said third blade assembly, wherein said fourth hydraulic cylinder comprises a fourth piston pivotably attached to a swash plate comprised by said rotor assembly, wherein said fourth hydraulic cylinder is hydraulically attached between said first hydraulic cylinder, said second hydraulic cylinder, and said third hydraulic cylinder such that hydraulic fluid flows between said first hydraulic cylinder, said second hydraulic cylinder, said third hydraulic cylinder, and said fourth hydraulic cylinder, wherein said first rotating comprises rotating said third blade in said first direction, and wherein said method further comprises:

rotating, said swash plate;

slidably moving, by said swash plate during said rotating swash plate, said fourth piston thereby controlling a flow of said hydraulic fluid between said first hydraulic cylinder, said second hydraulic cylinder, said third hydraulic cylinder, and said fourth hydraulic cylinder; and slidably moving, by said flow of said hydraulic fluid, said third piston resulting in pivotably moving said third blade assembly at different angular positions with respect to said rotor assembly, said first blade assembly, and said second blade assembly.

13. The method of claim 12, wherein said apparatus further comprises, a fourth blade assembly pivotably attached to said center shaft at a fourth initial position opposite to said third initial position, wherein an initial angle of 180 degrees exists between said third blade assembly with said respect to said fourth blade assembly, wherein said hydraulic movement mechanism further comprises a fifth hydraulic cylinder mechanically attached to said rotor assembly, wherein said fifth hydraulic cylinder comprises a fifth piston pivotably attached to said fourth blade assembly, wherein said fourth hydraulic cylinder is additionally hydraulically attached between said first hydraulic cylinder, said second hydraulic cylinder, said third hydraulic cylinder, and said fifth hydraulic cylinder such that said hydraulic fluid flows between said first hydraulic cylinder, said second hydraulic cylinder, said third hydraulic cylinder, said fourth hydraulic cylinder, and said fifth hydraulic cylinder, wherein said first rotating comprises rotating said fourth blade in said first direction, wherein said slidably moving said fourth piston additionally controls a flow of said hydraulic fluid between said first hydraulic cylinder, said second hydraulic cylinder, said third hydraulic cylinder, said fourth hydraulic cylinder, and said fifth hydraulic cylinder, and wherein said method further comprises:

slidably moving, by said flow of said hydraulic fluid, said fifth piston resulting in pivotably moving said fourth blade assembly at different angular positions with respect to said rotor assembly, said first blade assembly, said second blade assembly, and said third blade assembly.

14. The method of claim 9, wherein said apparatus is comprised by a helicopter.

15. The method of claim 9, further comprising:

providing at least one support service for at least one of creating, integrating, hosting, maintaining, and deploying computer-readable code in said computing system, wherein the code in combination with the computing system is capable of performing said first rotating and said pivotably moving.

16. A computer program product, comprising a computer readable hardware storage device storing a computer readable program code, said computer readable program code comprising an algorithm that when executed by a computer processor of a computing system implements a method for controlling an apparatus comprising a rotor assembly comprising a center shaft, a first blade assembly pivotably and directly attached to said center shaft at a first initial position, a second blade assembly pivotably and directly attached to said center shaft at a second initial position opposite to said first initial position, a first elongated member, a second elongated member, and a hydraulic movement mechanism, wherein said first blade assembly is in direct mechanical contact with said center shaft, wherein said second blade assembly is in direct mechanical contact with said center shaft, wherein said hydraulic movement mechanism comprises a first hydraulic cylinder mechanically attached to said rotor assembly and a second hydraulic cylinder mechanically attached to said rotor assembly, wherein said first hydraulic cylinder comprises a first piston pivotably attached to said first blade assembly, wherein said second hydraulic cylinder comprises a second piston pivotably attached to said second blade assembly, wherein said first elongated member mechanically attaches said first hydraulic cylinder to said rotor assembly, wherein said second elongated member mechanically attaches said second hydraulic cylinder to said rotor assembly, wherein said first elongated member comprises a first section formed perpendicular to a second section, wherein said first section is mechanically attached to said rotor assembly, wherein said second section is mechanically attached to said first hydraulic cylinder, wherein said second elongated member comprises a third section formed perpendicular to a fourth section, wherein said third section is mechanically attached to said rotor assembly, wherein said fourth section is mechanically attached to said second hydraulic cylinder, and wherein an initial angle of 180 degrees exists between said first blade assembly with said respect to said second blade assembly;

first rotating, by said rotor assembly, said first blade assembly and said second blade assembly in a first direction;

pivotably moving, by said hydraulic movement mechanism, said first blade assembly in different angular positions with respect to said rotor assembly and said second blade assembly;

slidably moving, by said first hydraulic cylinder, said first piston resulting in said pivotably moving said first blade assembly; and slidably moving, by said second hydraulic cylinder, said second piston resulting in said pivotably moving said second blade assembly.

* * * * *